Figure 1:
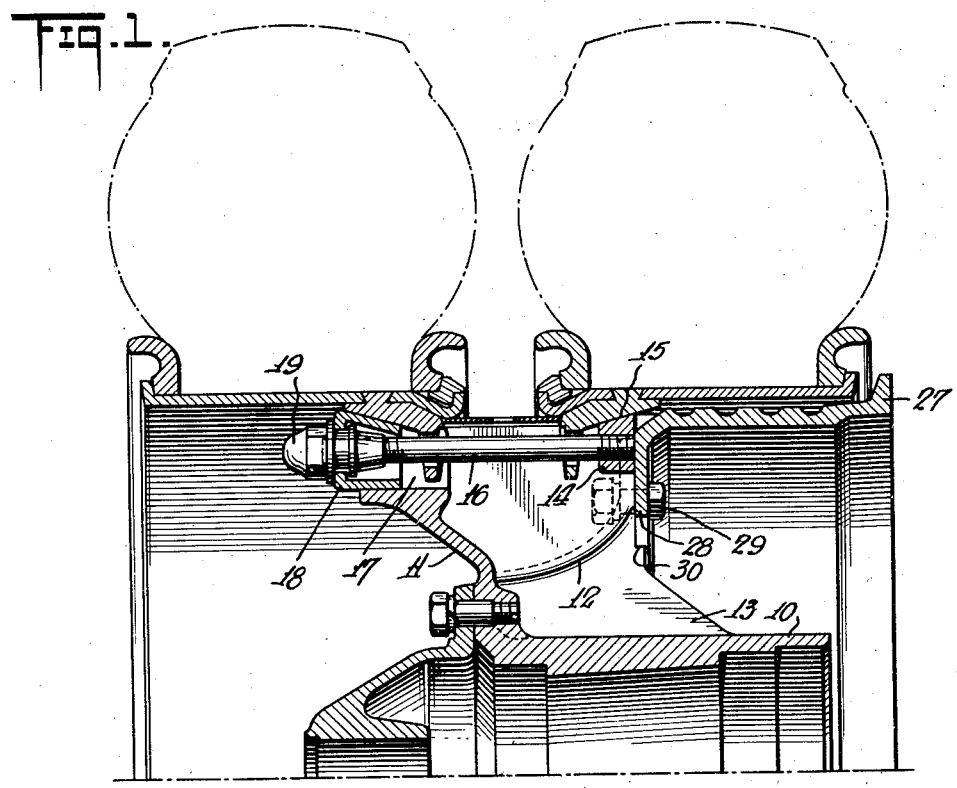

Feb. 7, 1933.   C. G. KELLER   1,896,821
VEHICLE WHEEL
Original Filed April 24, 1928

INVENTOR
Charles G. Keller
BY
ATTORNEYS

Patented Feb. 7, 1933

1,896,821

UNITED STATES PATENT OFFICE

CHARLES G. KELLER, OF HYDE PARK, NEW YORK

VEHICLE WHEEL

Original application filed April 24, 1928, Serial No. 272,404. Divided and this application filed July 31, 1931. Serial No. 554,183.

This application is a division of my prior and copending application Serial No. 272,404, filed April 24, 1928, and is for subject matter which is disclosed but not claimed in my prior application 263,373, filed March 21, 1928 now Patent No. 1,827,792, issued October 21, 1931.

The present invention is particularly applicable to the type of vehicle wheels in which channel shaped metal spokes have their edges connected by web sections which are cast integral therewith and which preferably curve both axially and radially between the spokes at their inner ends.

As an important feature of my present invention I brace this web from the hub at points between the adjacent spokes by means of ribs or partitions, and so form these ribs or partitions that their outer ends serve as shoulders or pilots to insure the proper centering of the brake drum and prevent any relative radial movement of the brake drum and the body of the wheel.

In the accompanying drawing I have illustrated my invention as applied to a wheel having twin pnuematic tires, and in which various novel features are illustrated which are not herein claimed, but are specifically claimed in copending applications. These features include a novel rim clamping means, also a novel construction and arrangement of the spokes in respect to the hub, rims, and brake, whereby a more effective cooling action during the rotation of the wheel is produced.

Figure 2:
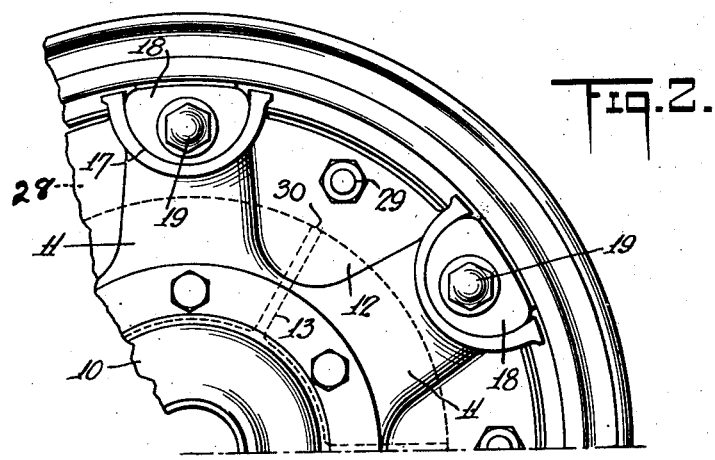

In the drawing:

Fig. 1 is a longitudinal radial section through a construction embodying my invention, and Fig. 2 is an end view.

I have illustrated my invention as applied to a vehicle wheel having a hub 10 and spokes 11 cast integral therewith, and in which no felly is employed. The spokes are substantially channel-shape in cross-section so as to provide an air passage lengthwise of each spoke, and through which air is caused to circulate by centrifugal or fan action when the wheel is rapidly rotated. The spokes are connected and braced by a web 12 which curves axially and radially from the outer side of the spoke at its inner end to the inner side of the spoke at its outer end. These webs are braced and reinforced by ribs 13 which are also cast integral and are disposed between adjacent spokes.

Each spoke at its outer end has a bridge piece 14 serving a double function. It presents an inclined outer surface 15 on which one rim may seat, and it also carries a bolt 16 to which the rim clamping member is detachably secured.

At the side of the spoke opposite to the bridge piece 14, that is, toward the outer side of the wheel, there is a substantially semi-circular axially disposed guideway or channel 17. The clamping bolt extends into or through this guideway at a point eccentrically disposed in respect to the axis of said guideway.

The features so far described in detail are somewhat similar to the construction illustrated in certain of my copending applications, for instance, Serial No. 182,199.

The construction illustrated is such that a brake drum of the maximum size in respect to the rim may be secured in place but out of direct heat transferring relationship to the rim. As shown there is provided a brake drum 27 having its outer surface closely adjacent to but spaced from the inner rim, and corrugated to facilitate heat radiation. The brake drum has an inwardly directed flange 28 which engages with and is bolted to the web 12 by means of bolts 29.

As one important feature of the present invention the ribs 13 are so designed that they present shoulders 30 serving as seats for the inner edge of the flange 28 so as to insure the proper centering of the brake drum. By centering the brake drum at a comparatively few spaced points along the inner edge of the flange 28, expansion and contraction of the brake drum due to temperature variation through a wide range will not cause deflection or warping of any part of the wheel itself, and there is afforded efficient and simple means for centering the same and also economical molding and machining operations.

The shoulders 30 hold the drum against any radial movement, and therefore if there be any eccentricity, warping and other departure from true axial alignment of the brake drum and the brake mechanism engaging therewith, the bolts will be relieved of any shearing strain. The drum will be properly held centered even if the bolts loosen or if the bolts be smaller than the bolt holes. The ribs 13 serves not only to impart rigidity and structural strength to the wheel, but also permit the use of a deeper flange 28 on the brake drum 27.

Having thus described my invention, what I claim as new and desire to secure by Letters Patent is:

1. A vehicle wheel structure having a hub, a plurality of U-shaped spokes open on the inboard sides thereof, a web integral with the spokes and extending substantially axially between adjacent spokes and spaced from the hub and extending radially at the inboard sides of the spokes, reenforcing ribs connecting the axially extending portion of said web and the radially outer surface of said hub between adjacent spokes, and presenting radially outwardly facing shoulders, said web, ribs and hub being cast integral, bridge pieces on the open sides of said spokes and between the walls of the latter and integral with said walls, said bridge pieces being disposed near the radially outer ends of said spokes, and having the inboard surfaces thereof substantially in the same plane as the inboard surface of the radially extending portion of said web, a brake drum having a radially inwardly directed flange directly in contact with the radial portion of the web and the inboard sides of said bridge pieces and centered by said shoulders, and threaded members extending through the radial portion of said web and said flange to secure said brake drum to the web.

2. A vehicle wheel structure having a hub, a plurality of U-shaped spokes open at the radially outer ends and on the inboard sides thereof, a web integral with the spokes and extending substantially axially between adjacent spokes, and spaced from the hub and extending radially at the inboard sides of the spokes, reenforcing ribs connecting the axially extending portion of said web and the radially outer surface of said hub between adjacent spokes, each having a portion extending in an inboard direction beyond said web, said extending portions presenting radially outwardly facing shoulders, said ribs, web and hub being cast integral, a brake drum having a radially inwardly directed flange partly enclosing the inboard sides of said spokes to form therewith air passages for the radial flow of air through said spokes, said flange engaging with and centered by the shoulders, and directly engaging the radially extending portion of the web, and members extending through the radial portion of said web and said flange to secure said brake drum to the web.

Signed at New York in the county of New York and State of New York this 24th day of July 1931.

CHARLES G. KELLER.